United States Patent
Richards et al.

(10) Patent No.: US 10,523,706 B1
(45) Date of Patent: Dec. 31, 2019

(54) PHISHING PROTECTION USING CLONING DETECTION

(71) Applicant: Lookout, Inc., San Francisco, CA (US)

(72) Inventors: Jeremy Boyd Richards, Oakville (CA); Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

(21) Appl. No.: 16/295,996

(22) Filed: Mar. 7, 2019

(51) Int. Cl.
*H04L 29/06* (2006.01)
*H04L 29/08* (2006.01)

(52) U.S. Cl.
CPC .......... *H04L 63/1483* (2013.01); *H04L 63/10* (2013.01); *H04L 67/02* (2013.01); *H04L 2463/146* (2013.01)

(58) Field of Classification Search
CPC ..... H04L 63/1483; H04L 63/10; H04L 67/02; H04L 2463/146
See application file for complete search history.

(56) References Cited

U.S. PATENT DOCUMENTS

| | | | | |
|---|---|---|---|---|
| 8,312,015 B1* | 11/2012 | Trevelyan | ............ | G06F 16/951 707/735 |
| 8,769,695 B2* | 7/2014 | Richards | ............... | G06F 21/552 726/22 |
| 9,077,748 B1* | 7/2015 | Hernacki | ............ | G06F 21/562 |
| 9,386,037 B1* | 7/2016 | Hunt | ................ | H04L 63/1483 |
| 2005/0108569 A1* | 5/2005 | Bantz | ............... | H04L 63/1475 726/4 |
| 2006/0253458 A1* | 11/2006 | Dixon | ............... | G06Q 30/02 |
| 2006/0253578 A1* | 11/2006 | Dixon | ............... | G06Q 10/06 709/225 |
| 2006/0253579 A1* | 11/2006 | Dixon | ............... | G06Q 30/02 709/225 |
| 2006/0253580 A1* | 11/2006 | Dixon | ............... | G06F 21/50 709/225 |
| 2006/0253581 A1* | 11/2006 | Dixon | ............... | G06Q 30/02 709/225 |
| 2006/0253582 A1* | 11/2006 | Dixon | ............... | H04L 67/20 709/225 |
| 2006/0253583 A1* | 11/2006 | Dixon | ............ | H04L 63/1441 709/225 |
| 2006/0253584 A1* | 11/2006 | Dixon | ............... | G06Q 30/02 709/225 |

(Continued)

*Primary Examiner* — David Garcia Cervetti
(74) *Attorney, Agent, or Firm* — Greenberg Traurig, LLP

(57) ABSTRACT

Techniques for phishing protection using cloning detection are described herein. The techniques described herein can include a server which hosts a website detecting that a fetcher is a cloning toolkit or an entity known for using a cloning toolkit. The techniques can also include a server which hosts a downloadable application (such as a mobile application) detecting that a fetcher for the application is a cloning toolkit or an entity known for using a cloning toolkit. The detection can be done in several ways, such as by analyzing data logs for patterns associated with cloning toolkits or entities known for using cloning toolkits. The techniques described herein can also include a part of an end user device (such as a part of a mobile device) detecting a clone (such as a clone website or application) that was cloned by a cloning toolkit. Then, upon detection, security actions can be taken.

18 Claims, 10 Drawing Sheets

(56) References Cited

U.S. PATENT DOCUMENTS

| | | | | |
|---|---|---|---|---|
| 2008/0235103 A1* | 9/2008 | Baccas | G06Q 30/0282 | 705/347 |
| 2009/0055928 A1* | 2/2009 | Kang | G06F 21/554 | 726/22 |
| 2009/0161554 A1* | 6/2009 | Agarwal | H04L 41/0631 | 370/241 |
| 2009/0249445 A1* | 10/2009 | Deshpande | G06F 21/31 | 726/3 |
| 2010/0186088 A1* | 7/2010 | Banerjee | G06F 21/51 | 726/23 |
| 2010/0235918 A1* | 9/2010 | Mizrahi | H04L 63/1416 | 726/25 |
| 2010/0269162 A1* | 10/2010 | Bravo | G06F 21/31 | 726/6 |
| 2011/0185421 A1* | 7/2011 | Wittenstein | G06F 21/554 | 726/22 |
| 2012/0304287 A1* | 11/2012 | Yu | G06F 21/56 | 726/22 |
| 2013/0312081 A1* | 11/2013 | Shim | H04L 63/0236 | 726/13 |
| 2014/0331119 A1* | 11/2014 | Dixon | H04L 63/168 | 715/234 |
| 2015/0319191 A1* | 11/2015 | Georgiev | H04L 61/1511 | 726/23 |
| 2016/0005050 A1* | 1/2016 | Teman | G06F 16/583 | 705/317 |
| 2016/0063541 A1* | 3/2016 | Geng | H04L 63/1483 | 705/14.47 |
| 2017/0178136 A1* | 6/2017 | Groarke | G06Q 20/12 | |
| 2017/0193386 A1* | 7/2017 | Qin | G06N 5/02 | |
| 2017/0286544 A1* | 10/2017 | Hunt | H04L 63/1416 | |
| 2017/0324760 A1* | 11/2017 | Gorny | H04L 63/1433 | |
| 2017/0331848 A1* | 11/2017 | Alsaleh | H04L 63/1483 | |
| 2018/0054456 A1* | 2/2018 | Ground | H04L 63/1433 | |
| 2018/0063190 A1* | 3/2018 | Wright | H04L 63/1425 | |

* cited by examiner

200

Detect cloning of an authentic website, by:
202 comparing characteristics of requests or a website access log of the authentic website against one or more models of website access by phishing toolkits
204

↓ determining, based on the comparison, a correlation between the website information and the model(s) exceeds a configurable similarity threshold
206

↓

Upon detection of cloning of authentic website, perform security action(s)
208

*Example security actions* altering at least one part of the authentic website so that when the authentic website is cloned into a clone website, the clone website includes an indicator that it is a cloned version of the authentic website  210 altering at least one part of the authentic website so that when the authentic website is cloned into a clone website, the clone website no longer sends or includes fields for inputting sensitive information  212 recording IP address(es) (or other identifier(s)) of computing device(s) associated with the cloning  214

| alerting an interested party by providing an audio and/or visual indicator of the cloning and the recorded IP address(es) (or other identifier(s))  216 | altering part(s) of the authentic website so that when the authentic website is cloned into a clone website, the clone website sends or includes a tracking mechanism  218 | blocking access to the authentic website by the one or more computing devices associated with the cloning  220 |

Detect cloning of an authentic website, by:
202

204 comparing an amount of HTTP requests from a requester immediately after an initial HTTP request for access to the authentic website from the requester, in the website access log, to a modeled amount of HTTP requests from a modeled phisher immediately after a modeled initial HTTP request for access to the authentic website from the modeled phisher, in the one or more models of website access of the authentic website

205

206 determining, from the comparison of HTTP requests, the correlation exceeds the configurable similarity threshold when the compared amount of HTTP requests, in the website access log, deviates from the compared modeled amount of HTTP requests, in the one or more models of website access of the authentic website, below a certain extent that is configurable

207

Upon detection of cloning of authentic website, perform security action(s)
208

- Detect cloning of an authentic website, by: 402
  - comparing characteristics of requests or a website access log of the authentic website against one or more models of website access by regular users  404
  - determining, based on the comparison, a correlation between the website information and the model(s) exceeds a configurable difference threshold  406

- Upon detection of cloning of authentic website, perform security action(s) 408

Example security actions
  - altering at least one part of the authentic website so that when the authentic website is cloned into a clone website, the clone website includes an indicator that it is a cloned version of the authentic website  410
  - altering at least one part of the authentic website so that when the authentic website is cloned into a clone website, the clone website no longer sends or includes fields for inputting sensitive information  412
  - recording IP address(es) (or other identifier(s)) of computing device(s) associated with the cloning  414
    - alerting an interested party by providing an audio and/or visual indicator of the cloning and the recorded IP address(es) (or other identifier(s))  416
    - altering part(s) of the authentic website so that when the authentic website is cloned into a clone website, the clone website sends or includes a tracking mechanism  418
    - blocking access to the authentic website by the one or more computing devices associated with the cloning  420

FIG. 4

400
Detect cloning of an authentic website, by:
402

404 comparing an amount of HTTP requests from a requester immediately after an initial HTTP request for access to the authentic website from the requester, in the website access log, to modeled amount of HTTP requests from a modeled requester immediately after a modeled initial HTTP request for access to the authentic website from the modeled requester, in the one or more models of website access of the authentic website

405

406 determining, from the comparison of HTTP requests, the correlation exceeds the configurable difference threshold when the compared amount of HTTP requests, in the website access log, deviates from the compared modeled amount of HTTP requests, in the one or more models of website access of the authentic website, above a certain extent that is configurable

407

Upon detection of cloning of authentic website, perform security action(s)
408

Detect a clone website or clone app, by:
602 retrieving, from a web browser or monitoring/security app, information of the clone website or clone app
604

↓ comparing the information of the clone website or app against model(s) of access of clone websites or clone apps
606

↓ determining, from the comparison, a correlation between the information of the clone and the model(s) exceeds a configurable similarity threshold
608

↓

Upon detection of clone website or clone app, perform security action(s)
610

Example security actions alerting an interested party of the clone website or the clone app    612 recording IP address(es) (or other identifier(s)) of computing device(s) serving the clone website or the clone app    614

↓ alerting an interesting party by providing an audio and/or visual indicator of the clone and the recorded IP address(es) (or other identifier(s))    616 blocking access to the clone
618

FIG. 6

PHISHING PROTECTION USING CLONING DETECTION

FIELD OF THE TECHNOLOGY

At least some embodiments disclosed herein relate to phishing protection in computer systems, and more particularly, but not limited to, phishing protection using cloning detection.

BACKGROUND

In general, phishing includes fraudulent attempts to obtain sensitive information such as usernames, passwords and credit card details by disguising as a trustworthy entity in an electronic communication. In some cases, the disguise can be a website or a downloadable application. In some other cases, for example, phishing can be carried out by email spoofing or instant messaging, which often directs users to enter personal or sensitive information at a fake website or into a fake application. The fakes, which are often clones of authentic websites or applications, can have the look and feel of which are identical to the real thing.

Clone phishing is a type of phishing attack whereby a legitimate, and previously delivered email, website, or application, for example, can contain parts that have had content taken and used to create an almost identical or cloned version of the property. The content of the email, website, or application is replaced with a malicious version and then distributed to one or more targeted victims. This technique could be used from an infected machine to gain access on another machine, through deception of a clone.

Phishing attackers will often clone a website or a downloadable application prior to a phishing attack. Often cloning is performed by a cloning toolkit. Some phishing attackers will only clone some assets, and will distribute other assets from the original authentic source of the website or the downloadable application.

SUMMARY OF THE DESCRIPTION

Techniques for providing phishing protection using cloning detection are described herein.

The techniques disclosed herein for providing phishing protection using cloning detection provide specific technical solutions to at least overcome the technical problems mentioned in the background section and other parts of the application as well as other technical problems not described herein but recognized by those skilled in the art.

The techniques described herein can include a server which hosts a website detecting that a fetcher is a cloning toolkit or an entity known for using a cloning toolkit. A separate server, such as a security server, connected to the website host server can also perform the detection. The techniques described herein can also include a server which hosts a downloadable application (such as a mobile application) detecting that a fetcher for the application is a cloning toolkit or an entity known for using a cloning toolkit. The detection can be done in several ways, such as by analyzing web logs for patterns associated with cloning toolkits or entities known for using cloning toolkits. The focus of the analysis can be on patterns of requests—such as patterns of HyperText Transfer Protocol (HTTP) requests—, headers on requests, IP addresses or other types of identifiers of a requester—such as the autonomous system number (ASN) of a requester's IP address. Other patterns of request for detecting cloners can include requests for specific part of the website. For example, if a website includes four parts and the request is for one part of the four parts, the pattern of request can indicate that one part of the part of the website is requested by a specific requesting source, or group of requesting sources. In another example, the pattern of request can include the sequence of requests for specific parts of data. For example, consider a website including four parts (part A, part B, part C, and part D) and a request source that requests the parts in order of part C, part D, and part B. The pattern of the requests can indicate that a requesting source, or group of requesting sources, requesting the website parts in sequence of part C, part D, and part B is a potential cloning toolkit because other users request the parts of the website in a different sequence (e.g., part D, part B, part A, part C). Also, the pattern of the requests can indicate that a requesting source (or group of requesting sources) requesting only three parts of the four part website is a potential cloning toolkit because other users request all four parts of the website.

The techniques described herein can also include a part of an end user device (such as a part of a mobile device) detecting a clone (such as a clone website or application) that was cloned by a cloning toolkit. A separate computing device, such as a security server, connected to the end user device can also perform the detection after the relevant access log and/or characteristics of one or more requests and/or source code of the clone is communicated to the separate computing device via a network. The detection by the part of the end user device can be done in several ways, such as by analyzing access logs for patterns associated with cloning toolkits or entities known for using cloning toolkits. The focus of the analysis can be on patterns of requests, headers on requests, IP addresses or other types of identifiers of a requester.

This disclosure includes various systems and devices that can perform the above methods as well as other methods described herein, which includes a non-transitory computer readable medium having instructions which when executed by a processor on a data processing system can cause the processor and/or the system to perform any one of the methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 2 shows an example method 200 for detecting cloning of an authentic website based on a comparison of characteristics of one or more requests or a website access log of the website against one or more models of website access by cloning toolkits, according to some embodiments.

FIG. 3 shows an example embodiment of method 200 based specifically on a comparison of HTTP requests in the log against HTTP requests in the model(s), according to some embodiments.

FIG. 4 shows an example method 400 for detecting cloning of an authentic website based on a comparison of characteristics of one or more requests or a website access log of the website against one or more models of website access by regular users (such as non-cloning toolkits users), according to some embodiments.

FIG. 5 shows an example embodiment of method 400 based specifically on a comparison of HTTP requests in the log against HTTP requests in the model(s), according to some embodiments.

FIG. 6 shows an example method 600 for detecting a clone (such as a clone website or a clone application cloned from a corresponding authentic website or application) based on a comparison of an access log and/or characteristics of one or more requests of the clone and/or source code of the clone against one or more models of access of clones, according to some embodiments.

DETAILED DESCRIPTION

Figure 1:
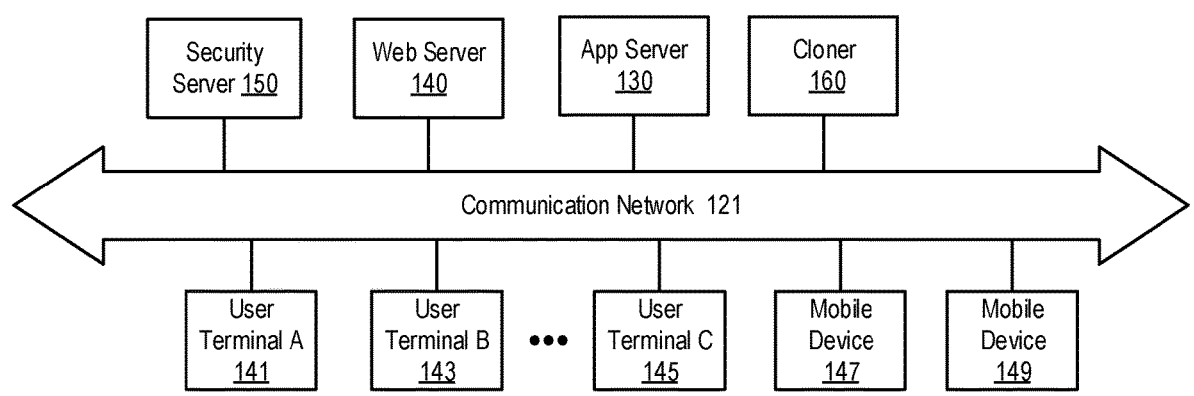
FIG. 1 shows a system for performing phishing protection, according to some embodiments.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in some embodiments" in various places in the specification are not necessarily all referring to the same embodiments, nor are separate or alternative embodiments mutually exclusive of other embodiments. Moreover, various features are described which may be exhibited by some embodiments and not by others. Similarly, various requirements are described which may be requirements for some embodiments but not other embodiments.

At least some embodiments disclosed herein relate to phishing protection using cloning detection. Phishing attackers will often clone a website (traditional website, progressive web app, etc.) or a downloadable application prior to a phishing attack. Often cloning is performed by a cloning toolkit. Some phishing attackers will only clone some assets, and will distribute other assets from the original authentic source of the website or the downloadable application.

There are two general solutions disclosed herein. At a server which hosts a website, detect that a fetcher is a cloning toolkit such as by using pattern of requests, headers on requests, IP address and/or ASN of requestor. Also, detect a clone website or application according to an access pattern the clone (e.g., access pattern of a phishing landing page loaded in a browser).

Regarding the first general solution, the techniques described herein can include a server which hosts a website detecting that a fetcher is a cloning toolkit or an entity known for using a cloning toolkit. A separate server, such as a security server, connected to the website host server can also perform the detection. The techniques described herein can also include a server which hosts a downloadable application (such as a mobile application) detecting that a fetcher for the application is a cloning toolkit or an entity known for using a cloning toolkit. The detection can be done in several ways, such as by analyzing characteristics of requests or web logs for patterns associated with cloning toolkits or entities known for using cloning toolkits. The focus of the analysis can be on patterns of requests—such as patterns of HTTP requests—, headers on requests, IP addresses or other types of identifiers of a requester—such as the ASN of requester. In some examples, the access pattern (such as the IP address requesting a sequence of resources from a web server) of the login page is different depending on if it is loaded directly in a normal browsing session versus resources loaded due to being included in a cloning toolkit. Techniques described herein can generate access pattern fingerprints that match a cloning toolkit.

Also, models of access by known cloning toolkits can be built. The techniques can additionally include mining characteristics of requests or web server logs to build models of access by cloning toolkits as well as mining characteristics of requests or web server logs to build models of normal access by regular users (e.g., non-cloning-toolkit users). There can be significant differences in modes of website and/or web server access between regular users (e.g., non-cloning-toolkit users) and cloning toolkits. For example, a cloning toolkit may not fetch every referenced page object from a page on a website, or can fetch them in a different sequence than a regular user, or can fetch them in a different volume than a regular user, or can fetch them with a different timing than a regular user, or can have different HTTP headers, or other measurable or observable differences in behavior. In other words, factors that can be considered when deciding whether the access request is from a potential cloner can include volume of content requested, geographic location of access request, time of content request, duration of content request, etc. And, such factors can be weighted. For example, a potential cloner can be determined when a content request includes a high volume from a location that typically does not access the website. This may signal that the requester is a potential cloner.

Using such models, the techniques can detect a phishing attacker using a cloning toolkit versus a normal user accessing a website (traditional website, progressive web app, etc.), web application, or a downloadable application. The detection can be done by analyzing the characteristics of requests or the web server log and applying one or more of the models. Also, detection can occur through state management on the web server, such as performing the analysis within the web server at the point where state is being updated.

Upon detection of a cloner (such as cloner 160 depicted in FIG. 1), security actions can be taken, such as alerting a security administrator, serving different content to a detected phisher, denying some content to a detected phisher, injecting a tracking content (such as a tracking code) into the content served, or recording the IP of the fetcher. Tracking content can include digital content that is hidden from the user but visible to a machine. For example, an inserted tracking content can be identified by an application and cause the application to display a warming to the user or block the website. In some embodiments the tracking content includes content that is visible to the user. The tracking content can include encoded tracking value inserted into the content presented responsive to the cloner request. The tracking content can be obfuscated, it can also be encrypted public key cryptography or other encryption methods. In some embodiments, the tracking content can be associated with a timestamp or identification that can be used to correlate the tracking content to the content request. Also, a tracking content can be unique and determined based on the access request. For example, when cloner A requests content, the cloner can be provided with content having a tracking content associated with the request and the cloner, and when a closer B requests content, the cloner can be provided with content having a tracking content associated with that request and the cloner. When the websites built by cloner A are identified, the tracking content associated with those websites can provide the identification of cloner A. Also, when the websites built by cloner B are identified, the tracking content associated with those websites can provide the identification of cloner B.

Regarding the second general solution, the techniques described herein can also include a part of an end user device (such as a part of a mobile device) detecting a clone (such as a clone website or application) that was cloned by a cloning toolkit. A separate computing device, such as a security server, connected to the end user device can also perform the detection after the relevant access log and/or the characteristics of one or more requests and/or source code of the clone is communicated to the separate computing device via a network. The detection by the part of the end user device can be done in several ways, such as by analyzing access logs for patterns associated with cloning toolkits or entities known for using cloning toolkits. The focus of the analysis can be on patterns of requests, headers on requests, IP addresses or other types of identifiers of a requester.

For example, an access pattern of a phishing landing page, cloned from an authentic webpage, can be detected as it is loaded in a web browser. The techniques can include detecting, in loaded HTML, a part loaded from a known or suspected phishing domain. The techniques can make such a detection even when multiple resources are loaded directly from a corresponding authentic website or infrastructure.

Also, the techniques can further inspect HTTP headers used when loading resources included in a cloned website or application. And, the techniques can detect the location of an attacker, using cloning, within a network—such as the Internet. The location of the attacker within a network can be detected from a request for resources controlled by the attacker. For instance, the HTTP referrer of the resource is detectable, which can show a network location of the attacker. Given these example techniques, the techniques can catch a phisher's infrastructure in real time as users are being phished through a clone website, clone web application, or clone downloadable application. This opens a number of doors for a defender to be explored. For example, upon detection of a clone, security actions can be taken, such as alerting a security administrator, directing a server to serve different content to a detected phisher, directing a server to deny some content to a detected phisher, directing a server to inject some "tracking content" into the content served, or recording the IP of the malicious website or application.

Also, for example, the presence of an HTTP referrer header on the request for a webpage component, where the referrer is not the authentic domain is big clue that phishing is going on. In such a case, the techniques can determine an actual phishing domain and URL. Security servers or administrators can be notified with the location of the phishing website, and threat feeds can be updated.

Also, based on models of normal browsing, the techniques can detect that some webpage components were not fetched while others were; this is a strong indicator of ongoing phishing. But, in the absence of an HTTP referrer header, the techniques may only detect the IP of the victim, not the attacker. Notifications can be sent to security servers or administrators, accordingly.

Regarding both general solutions for cloning detection, such as whether attackers are detected from a server's log or characteristics of one or more requests and/or source code and/or access log in an end user device, security actions can be taken upon the detection. The security actions can be taken by the related authentic servers or by software and/or hardware in the end user device. The techniques can generate dynamic content such as by using scripts (such as scripts implemented with JavaScript). The scripts can be inserted covertly in served properties, so that a cloner clones the scripts with other assets unknowingly. Theses scripts can implement parts of the security actions taken after detection of a cloner.

Also, through analysis of logs and/or the characteristics of one or more requests and/or source code, cloned parts and fields of a cloned website or application can be detected and altered (such as altered in a covert way) to implement part of a security action.

The analysis of the techniques can include comparisons of logs and/or the characteristics of one or more requests and/or source code related to access and use of an electronic property against models of access and use by cloning toolkits. The analysis can also include comparisons of logs and/or the characteristics of one or more requests and/or source code related to access and use of an electronic property against models of access and use by regular users or entities (such as non-toolkit users).

The analysis can also include monitoring the activity in the HTTP webserver application, and monitoring activity at a front-end proxy server. Monitoring activity at a front-end proxy server can be performed by caching proxy server in front of their regular webserver to improve performance by delivering static content that is cached there. For example, a front-end proxy can allow for monitoring every request (e.g., HTTP, HTTPS, TLS, and SSL), and simply pass it along to) the web server. In some embodiments, the front-end proxy can monitor every request and or optionally serve some unique content or deny some content (e.g., deny content when cloned site is identified).

The analysis can also include monitoring activity via a passive network listener server/network appliance. In some embodiments, the passive listener server and/or network appliance can listen to the network traffic (e.g., "promiscuous mode" on ethernet), and thereby monitor all incoming HTTP requests. In such example, the listener can either be provisioned with the HTTP server's certificate or could be provided by the HTTP server the negotiated symmetric session key so that it could decrypt any HTTPS and/or TLS traffic. In some embodiments, the analysis can also include monitoring activity via a network "middle box" such as a router, switch, firewall, etc.

Detection of a phisher can occur through an output of a comparison with a model of access by cloning toolkits exceeding a similarly threshold. In other words, cloner detection occurs when the comparison shows relevant parts of the logs and/or the characteristics of one or more requests and/or source code are similar to models of access of known attackers and toolkits.

Detection of a phisher can also occur through an output of a comparison with a model of access by regular users exceeding a difference threshold. In other words, cloner detection occurs when the comparison shows relevant parts of the logs and/or the characteristics of one or more requests and/or source code are sufficiently different to models of access of regular users.

FIG. 1 shows a system for performing phishing protection using cloning detection by application server 130, web server 140, security server 150, a user terminal (e.g., one of terminals 141, 143, 145), and/or a mobile device (e.g., one of mobile devices 147 or 149), according to some embodiments. In FIG. 1, the user terminals 141, 143, and 145 and/or mobile devices 147 and 149 are used to access and/or communicate with application server 130, application server 140 and security server 150 over a communication network 121 (e.g., the Internet, a wide area network, a local network, or other wired or wireless communications network).

Network 121 can be used to download and remotely install applications selected from the application server 130. The application server 130 can be part of a marketplace (e.g., using Google Play or the Android Market). Marketplace can include one or more web servers (or other types of data communication servers) to communicate with the user terminals (e.g., 141, 143, . . . , 145) and mobile devices 147, 149. Also, network 121 can be used to access websites or web applications such as from the web server 140.

The cloner 160 represents an example of a phishing attacker that can use a cloning toolkit to clone or at least attempt to clone one or more websites served from the web server 140 and/or one or more downloadable applications served from the application server 130.

Mobile devices can include, for example cell phones, smartphones, and tablet devices such as the iPhone device or an Android tablet. Mobile devices can also include automobiles, planes, or other vehicles that include a computing device, such as an embedded computing or communication system that communicates via the Internet over a cellular phone system, or other portable computing devices (e.g., devices that pair with a mobile device using Bluetooth, such as an Apple watch). The mobile devices communicate with the servers, websites and application marketplaces.

Additional examples of mobile devices include devices that are part of what is called "the internet of things" (IOT). In the IOT there are multiple devices which operate without accompanying and attendant users. Such devices can be mobile or sessile; they can have various sensors and computing and communication capabilities and can run applications; schematically they can be considered substantially similar to a mobile device. Such "things" can have occasional interactions with owners or administrators of the "things", who can monitor the things or modify settings on these things. Such owners or administrators play the role of users with respect to the "thing" devices. In some examples, the primary mobile device of a user can be an administrator server with respect to a paired "thing" device that is worn by the user (e.g., an Apple watch). In an embodiment, a "thing" or a device, e.g., one intended for use as a health or medical device, can have an embedded white list defining trusted sources for applications, or can have an administrator associated with that device.

FIG. 2 shows an example method 200 for detecting cloning of an authentic website based on a comparison of characteristics of requests or a website access log of the website against one or more models of website access by cloning toolkits, according to some embodiments. FIG. 3 shows an example embodiment of method 200 based specifically on a comparison of HTTP requests in the log against HTTP requests in the model(s), according to some embodiments. FIG. 4 shows an example method 400 for detecting cloning of an authentic website based on a comparison of characteristics of requests or a website access log of the website against one or more models of website access by regular users (such as non-cloning toolkits users), according to some embodiments. FIG. 5 shows an example embodiment of method 400 based specifically on a comparison of HTTP requests in the log against HTTP requests in the model(s), according to some embodiments.

Operations of the methods 200 and 400 can be performed by any one of the various systems described herein, which includes a non-transitory computer readable medium having instructions which when executed by a processor on a data processing system can cause the processor and/or the system to perform any one of the operations. For example, in some embodiments, the operations of the methods 200 and 400 can be performed by security server 150, web server 140, application server 130 and/or the computing device 1001 illustrated in FIG. 10.

Methods 200 and 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

Although shown in a particular sequence or order, unless otherwise specified, the order of the operations of methods 200 and 400 can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other process flows are possible.

In some embodiments, the authentic website is a Progressive Web Application (PWA). In some embodiments, a value can be calculated for each section of the website. The calculation can include checksum functions, hash functions, or fingerprints. Sections of the website can include images on the website, text on the website, video images of the website, individual pages of website, or frames of a website. In some embodiments, a calculated value can be an entire website rather than sections of the website. The calculated values (e.g., hash values) can be stored. In some embodiments, when a website (e.g., PWA) is opened on a device, a calculated value (e.g., hash value) of website sections can be calculated and compared to the stored calculated values of the authentic website sections.

In some embodiments the calculated value can be determined for selected websites. For example, websites in a certain category like enterprise, financial, medical, etc. In some embodiments, a user or an administrator can select categories or create a list of websites for which to determine a calculated value. For example, a user can determine that all websites having a banking category should be protected with this technique. A user can select on a mobile application (or an administrative console) the banking category as a category which requires additional security. In response to the user's selection of this category, when the user opens a website associated with a banking category, the hash value is determined of the website displayed to the user and the hash value is compared to a hash value of the authentic website. When the hash value of the displayed website and the authentic website match, a determination can be made that the displayed website is not cloned. In some embodiments, when the hash value of the displayed website and the authentic website do not match, a determination can be made that the displayed website is cloned.

In some embodiments, when the hash value of the displayed website and the authentic website do not match a determination can be made for further investigation. Further investigation can include creating an updated calculated value (e.g., hash value) of the authentic website and comparing it against the calculated value of the displayed website. Further investigation can also include identifying whether a tracking code is imbedded in the displayed website. In some embodiments, the hash value of the authentic website has been precalculated and reside on the device. Also, a hash value can be predetermined and can be stored on a server, with which the device communicates in order to make a comparison. The comparison can be made by the server in the latter example.

Referring to FIGS. 2-3, at block 202, a computing device detects cloning of an authentic website (e.g., an authentic mobile website). The detection of cloning can occur by comparing characteristics of requests or a website access log of the authentic website against one or more models of website access by cloning toolkits (such as toolkits used by cloners—e.g. cloner 160 depicted in FIG. 1)—at block 204. In some examples, alternatively, various logs of a content distribution network (CDN) can be compared against one or more models of website access by cloning toolkits. The detection of cloning can also occur by determining, from the comparison, a correlation between the characteristics of requests or the website access log and the one or more models exceeds a similarity threshold—at block 206. In some examples, alternatively, if there is state management on the web server, the detection can be done within the web server at the point where state is being updated.

In some embodiments, the similarity threshold can be automatically updated or and/or can be dynamically updated based on accuracy rating of the requests that were previously identified as cloning toolkits.

In some embodiments, the comparison of the characteristics of requests or the website access log can include comparing elements of the characteristics or the log associated with a login field of the authentic website or a login portion of the authentic website including the login field.

Also, in some embodiments, the comparison of the characteristics of requests or the website access log can include comparing domain names requesting access to the authentic website in the characteristics or the log against domain names in the one or more models listed as domain names of known entities using cloning toolkits.

At block 208, upon detection of cloning of the authentic website, at least the computing device performs one or more security actions. Actions can be taken, such as alerting a security administrator, serving different content to a detected phisher, or denying some content to a detected phisher, injecting some "tracking content" into the content served, or recording the IP of the fetcher.

For example, at block 210, upon detection of cloning of the authentic website, the computing device can alter at least one part of the authentic website so that when the authentic website is cloned into a clone website by a cloning toolkit the clone website includes an indicator (such as a secret indicator or audio and/or visual indicator) that it is a cloned version of the authentic website. The audio and/or visual indicator can include a voice output, a text output, audio alarm sound, a visual alarm graphic, a watermark, an animation, a popup window, a distortion of content in the clone website, and/or any combination thereof.

Also, for example, at block 212, upon detection of cloning of the authentic website, the computing device can alter the at least one part of the authentic website (or another part of the website) so that when the authentic website is cloned into a clone website by a cloning toolkit the clone website no longer includes fields for inputting sensitive information (e.g., sensitive information can include usernames, passwords, social security numbers, credit card information, etc.). Alternatively, upon detection of cloning of the authentic website, the altering can include altering information sent by the authentic website so that when the authentic website is cloned into a clone website by a cloning toolkit the clone website no longer sends fields for inputting sensitive information Any of the altering of the at least one part of the authentic website described herein can include altering the at least one part of the authentic website according to one or more elements in the characteristics of requests or the website access log that match one or more elements in the one or more models of website access by cloning toolkits.

At block 214, upon detection of cloning of the authentic website, the computing device can record one or more IP addresses (or other identifiers such as ASN) of one or more computing devices associated with the cloning. Further, upon detection of the cloning of the authentic website, the computing device can alert a user of the computing device or an administrator of one or more servers serving the authentic website. The alerting can include providing an audio and/or visual indicator of the cloning and the recorded one or more IP addresses of the one or more computing devices associated with the cloning—at block 216. Also, upon detection of the cloning of the authentic website, the computing device can alter information sent by the authentic website or the at least one part of the authentic website (or another part of the website), so that when the authentic website is cloned into a clone website by a cloning toolkit the clone website sends or includes a tracking mechanism that tracks operations of one or more computing devices serving the clone website, covertly—at block 218. And, upon detection of the cloning of the authentic website, the computing device can block access to the authentic website by the one or more computing devices associated with the cloning—at block 220.

In some embodiments, the one or more models of website access by cloning toolkits can include one or more models of website access of the authentic website specifically. In such examples, as shown in FIG. 3, the detecting of cloning can further include comparing a number of HTTP requests from a requester immediately after an initial HTTP request for access to the authentic website from the requester, in the website access log, to a modeled number of HTTP requests from a modeled phisher immediately after a modeled initial HTTP request for access to the authentic website from the modeled phisher, in the one or more models of website access of the authentic website—at block 205. Also, as shown in FIG. 3, the detecting of cloning can further include determining, from the comparison of HTTP requests, the correlation exceeds the similarity threshold when the compared number of HTTP requests, in the website access log, deviates from the compared modeled number of HTTP requests, in the one or more models of website access of the authentic website, below a certain extent—at block 207.

Referring to FIGS. 4-5, at block 402, a computing device detects cloning of an authentic website (e.g., an authentic mobile website). The detection of cloning can occur by comparing characteristics of requests or a website access log of the authentic website against one or more models of website access by regular users—at block 404. In some examples, alternatively, various logs of a content distribution network (CDN) can be compared against one or more models of website access by regular users. The detection of cloning can also occur by determining, from the comparison, a correlation between the characteristics of requests or the website access log and the one or more models exceeds a difference threshold—at block 406. In some examples, alternatively, if there is state management on the web server, the detection can be done within the web server at the point where state is being updated. In some embodiments, the comparison of the characteristics of requests or the website access log can include comparing elements of the characteristics or the log associated with a login field of the authentic website or a login portion of the authentic website including the login field. Also, in some embodiments, the comparison of the characteristics of requests or the website access log can include comparing domain names requesting access to the authentic website in the characteristics or the log against a list of domain names of known entities using phishing toolkits (e.g., the entities can include cloners such as cloner 160 depicted in FIG. 1).

At block 408, upon detection of cloning of the authentic website, at least the computing device performs one or more security actions. Actions can be taken, such as alerting a security administrator, serving different content to a detected phisher, or denying some content to a detected phisher, injecting some "tracking content" into the content served, or recording the IP of the fetcher.

For example, at block 410, upon detection of cloning of the authentic website, the computing device can alter at least one part of the authentic website so that when the authentic website is cloned into a clone website by a cloning toolkit the clone website includes an indicator (e.g., a secret indicator or an audio and/or a visual indicator) that it is a cloned version of the authentic website. The audio and/or visual indicator can include a voice output, a text output, audio alarm sound, a visual alarm graphic, a watermark, an animation, a popup window, a distortion of content in the clone website, or any combination thereof.

Also, for example, at block 412, upon detection of cloning of the authentic website, the computing device can alter the at least one part of the authentic website (or another part of the website) so that when the authentic website is cloned into a clone website by a cloning toolkit the clone website no longer includes fields for inputting sensitive information (e.g., sensitive information can include usernames, passwords, social security numbers, credit card information, etc.). Any of the altering of the at least one part of the authentic website described herein can include altering the at least one part of the authentic website according to one or more elements in the characteristics of requests or the website access log that match one or more elements in the one or more models of website access by regular users. Alternatively, upon detection of cloning of the authentic website, the altering can include altering information sent by the authentic website so that when the authentic website is cloned into a clone website by a cloning toolkit the clone website no longer sends fields for inputting sensitive information.

At block 414, upon detection of cloning of the authentic website, the computing device can record one or more IP addresses (or other identifiers such as ASN) of one or more computing devices associated with the cloning. Further, upon detection of the cloning of the authentic website, the computing device can alert a user of the computing device or an administrator of one or more servers serving the authentic website. The alerting can include providing an audio and/or visual indicator of the cloning and the recorded one or more IP addresses of the one or more computing devices associated with the cloning—at block 416. Also, upon detection of the cloning of the authentic website, the computing device can alter information sent by the authentic website or the at least one part of the authentic website (or another part of the website), so that when the authentic website is cloned into a clone website by a cloning toolkit the clone website sends or includes a tracking mechanism that tracks operations of one or more computing devices serving the clone website, covertly—at block 418. And, upon detection of the cloning of the authentic website, the computing device can block access to the authentic website by the one or more computing devices associated with the cloning—at block 420.

In some embodiments, the one or more models of website access by regular users can include one or more models of website access of the authentic website specifically. In such examples, as shown in FIG. 5, the detecting of cloning can further include comparing a number of HTTP requests from a requester immediately after an initial HTTP request for access to the authentic website from the requester, in the website access log, to a modeled number of HTTP requests from a modeled regular requester immediately after a modeled initial HTTP request for access to the authentic website from the modeled regular requester, in the one or more models of website access of the authentic website—at block 405. Also, as shown in FIG. 3, the detecting of cloning can further include determining, from the comparison of HTTP requests, the correlation exceeds the difference threshold when the compared number of HTTP requests, in the website access log, deviates from the compared modeled number of HTTP requests, in the one or more models of website access of the authentic website, above a certain extent—at block 407.

Operations of the methods 600 and 800 can be performed by any one of the various systems described herein, which includes a non-transitory computer readable medium having instructions which when executed by a processor on a data processing system can cause the processor and/or the system to perform any one of the operations. For example, in some embodiments, the operations of the methods 600 and 800 can be performed by one of the user terminals or mobile devices illustrated in FIG. 1 and/or the computing device 1101 illustrated in FIG. 11.

Methods 600 and 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

Although shown in a particular sequence or order, unless otherwise specified, the order of the operations of methods 600 and 800 can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other process flows are possible.

Figure 7:
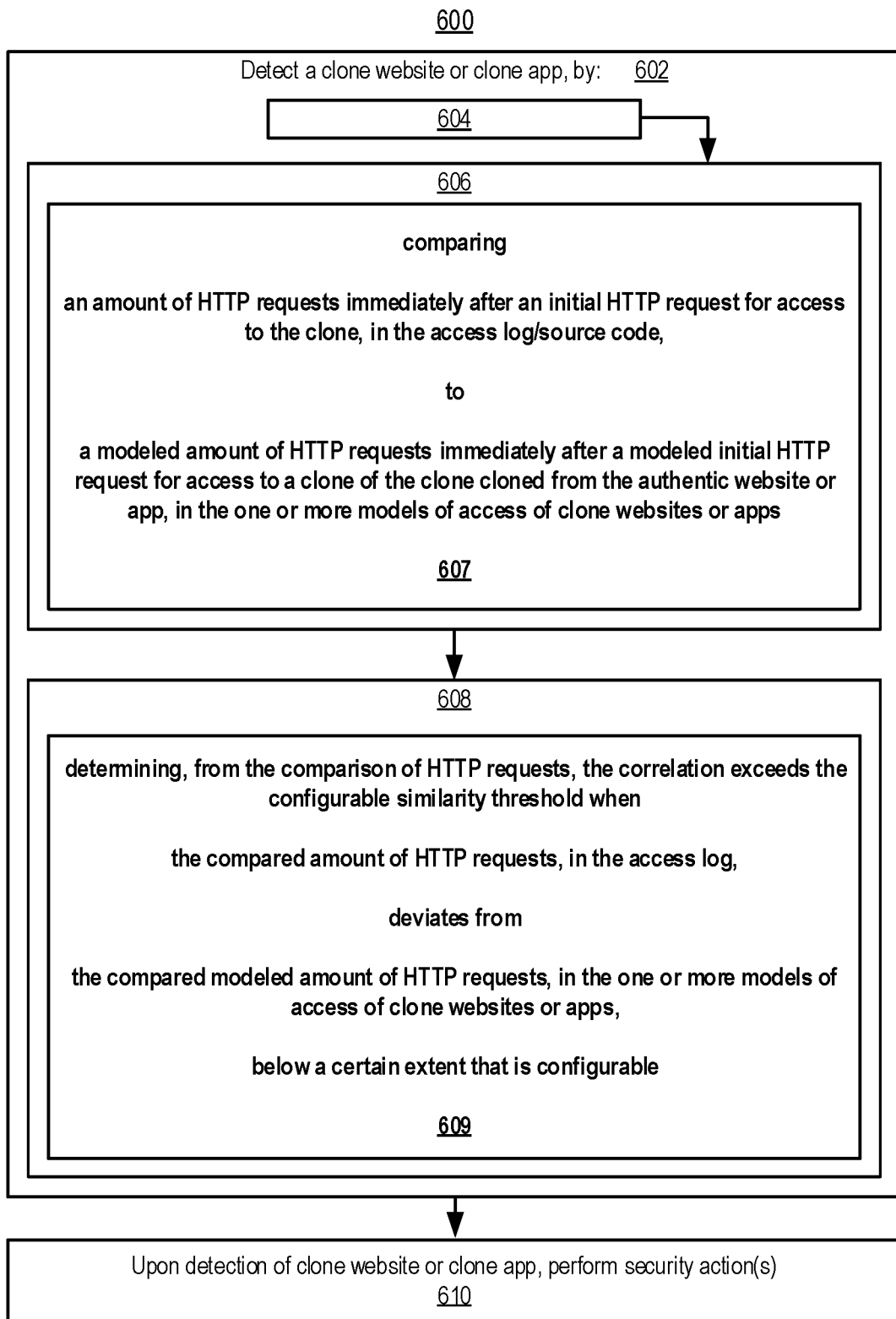
FIG. 7 shows an example embodiment of method 600 based specifically on a comparison of HTTP requests in the log and/or the characteristics of one or more requests and/or the source code against HTTP requests in the model(s), according to some embodiments.

Referring to FIGS. 6-7, at block 602, a computing device (e.g., a mobile device) detects a clone (e.g., a clone website or a clone application) cloned from an authentic electronic property (e.g., an authentic website or an authentic application) by a cloning toolkit (such as a toolkit used by cloners—e.g. cloner 160 depicted in FIG. 1). The detection of the clone can occur by retrieving, from an application running the clone on the device (e.g., a web browser or a system browser or a security application), characteristics of one or more requests or an access log or code of the clone (e.g., characteristics of one or more requests and/or an access log and/or HTML code of a clone website and/or characteristics of one or more requests and/or an access log and/or source code of a clone application)—at block 604.

The detection of the clone can also occur by comparing the characteristics of one or more requests or an access log or code of the clone against one or more models of access of clones cloned from authentic electronic properties by cloning toolkits—at block 606. In some embodiments, the detection of the clone can also occur by comparing characteristics of one or more requests or an access log or code of a clone website against one or more models of website access of clone websites cloned from authentic websites by cloning toolkits. In some other embodiments, the detection of the clone can also occur by comparing an access log and/or the characteristics of one or more requests and/or source code of a clone application against one or more models of application access of clone applications cloned from authentic applications by cloning toolkits.

In some embodiments, the comparison of the access log or code can include comparing elements of the log or code associated with a login field of the authentic electronic property or a login portion of the authentic electronic property including the login field. Also, in some embodiments, the comparison of the access log or code can include comparing domain names requesting access to the authentic electronic property in the log against domain names in the one or more models listed as domain names of known entities using cloning toolkits.

The detection of the clone can also occur by determining, from the comparison, a correlation between the characteristics of one or more requests or an access log or code of the clone and the one or more models exceeds a similarity threshold—at block 608. In some embodiments, the detection of the clone can also occur by determining, from the comparison, a correlation between the characteristics of one or more requests or an access log or code of the clone and the one or more models exceeds a similarity threshold. In some other embodiments, the detection of the clone can also occur by determining, from the comparison, a correlation between the access log and/or the characteristics of the one or more requests and/or the source code of the clone application and the one or more models exceeds a similarity threshold.

At block 610, upon detection of the clone (such as upon detection of the clone website or clone application), at least the computing device performs one or more security actions. Actions can be taken, such as alerting a security administrator, directing serving different content to a detected phisher, or directing denying some content to a detected phisher, directing injecting some "tracking content" into the content served, or recording the IP of the fetcher.

For example, at block 612, upon detection of the clone (such as a clone website or the clone application), the computing device can alert a user of the computing device or an administrator of one or more servers serving the authentic electronic property (such as an administrator of one or more servers distributing an authentic website or an administrator of one or more servers distributing an authentic application). Also, for example, upon detection of the clone, the computing device can record one or more IP addresses (or other identifiers) of one or more computing devices serving the clone—at block 614. In such cases, the alerting can include providing an audio and/or visual indicator of the clone and the recorded one or more IP addresses of the one or more computing devices serving the clone—at block 616. Further, upon detection of the clone, the computing device can block access to the clone—at block 618. For example, upon detection of the clone, the computing device can block access to the clone by the computing device. Also, for example, upon detection of the clone, the computing device can direct blocking, by the one or more computing devices serving corresponding authentic electronic property, access to the property by the one or more computing devices serving the clone.

In some embodiments, one or more models of website access of clone websites can include one or more models of website access of clone websites cloned from the authentic website of concern, specifically. In such examples, as shown in FIG. 7, the detecting of clone can further include comparing a number of HTTP requests immediately after an initial HTTP request for access to the clone website, in the characteristics of one or more requests or an access log or code of the clone, to a modeled number of HTTP requests immediately after a modeled initial HTTP request for access to a clone website of the clone websites cloned from the authentic website, in the one or more models of website access of clone websites cloned from the authentic website—at block 607. Also, as shown in FIG. 7, the detecting of clone can further include determining, from the comparison, the correlation exceeds the similarity threshold when the compared number of HTTP requests, in the characteristics of one or more requests or an access log or code of the clone, deviates from the compared modeled number of HTTP requests, in the one or more models of website access of clone websites cloned from the authentic website, below a certain extent—at block 609. This comparing and determining could also be done from more generic models than the models relevant to the specific authentic website.

In some other embodiments, one or more models of access of clone applications can include one or more models of access of clone applications cloned from the authentic application of concern, specifically. In such examples, as shown in FIG. 7, the detecting of clone can further include comparing a number of HTTP requests immediately after an initial HTTP request for access to the clone application, the access log and/or the characteristics of one or more requests and/or the source code, to a modeled number of HTTP requests immediately after a modeled initial HTTP request for access to a clone application of the clone applications cloned from the authentic application, in the one or more models of access of clone applications cloned from the authentic application—at block 607. Also, as shown in FIG. 7, the detecting of clone can further include determining, from the comparison, the correlation exceeds the similarity threshold when the compared number of HTTP requests, in the access log and/or the characteristics of one or more requests and/or the source code, deviates from the compared modeled number of HTTP requests, in the one or more models of access of clone applications cloned from the authentic application, below a certain extent—at block 609.

This comparing and determining could also be done from more generic models than the models relevant to the specific authentic application.

Figure 8:
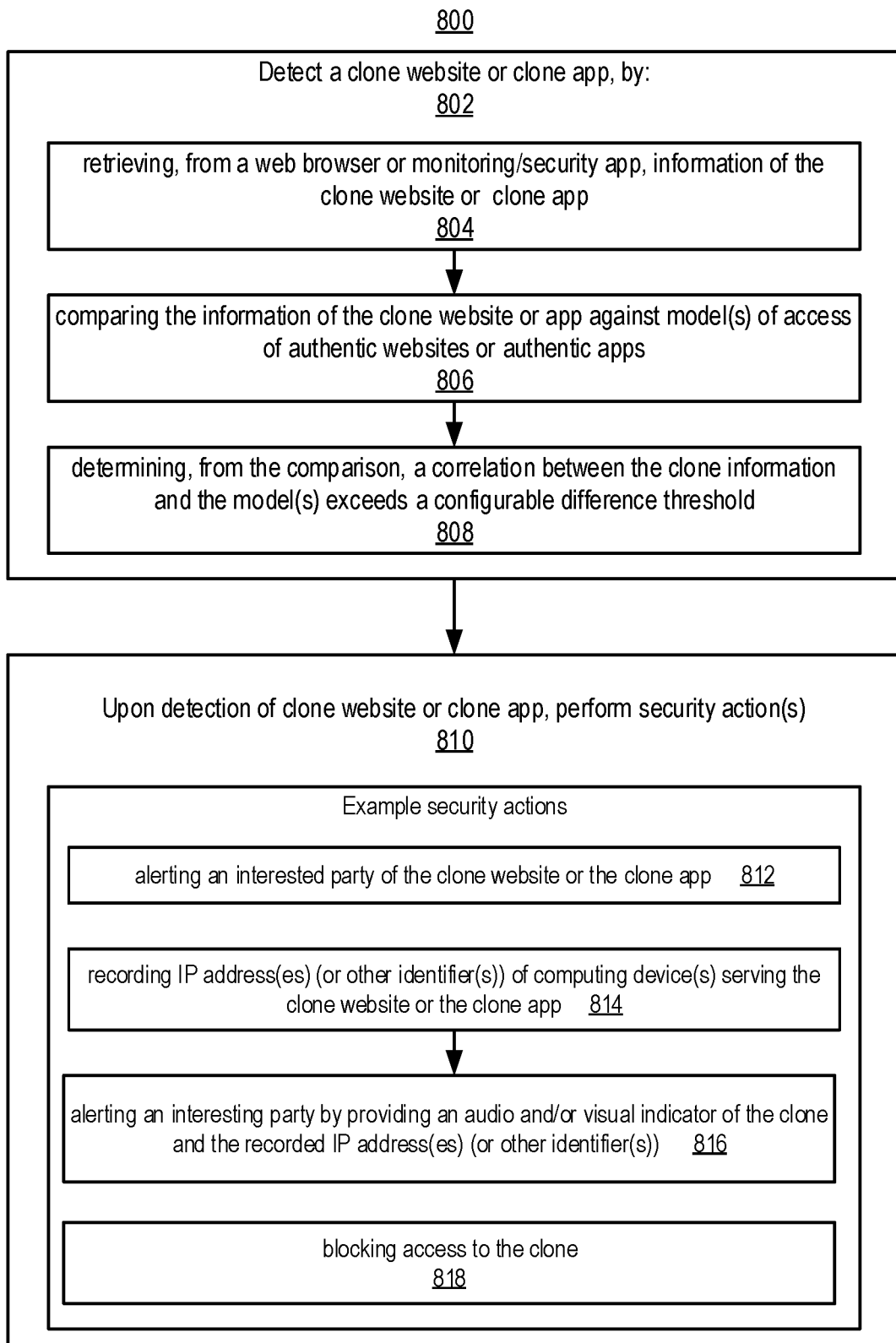
FIG. 8 shows an example method 800 for detecting a clone (such as a clone website or a clone application cloned from a corresponding authentic website or application) based on a comparison of an access log and/or the characteristics of one or more requests and/or the source code of the clone against one or more models of access of authentic websites or applications, according to some embodiments.
Figure 9:
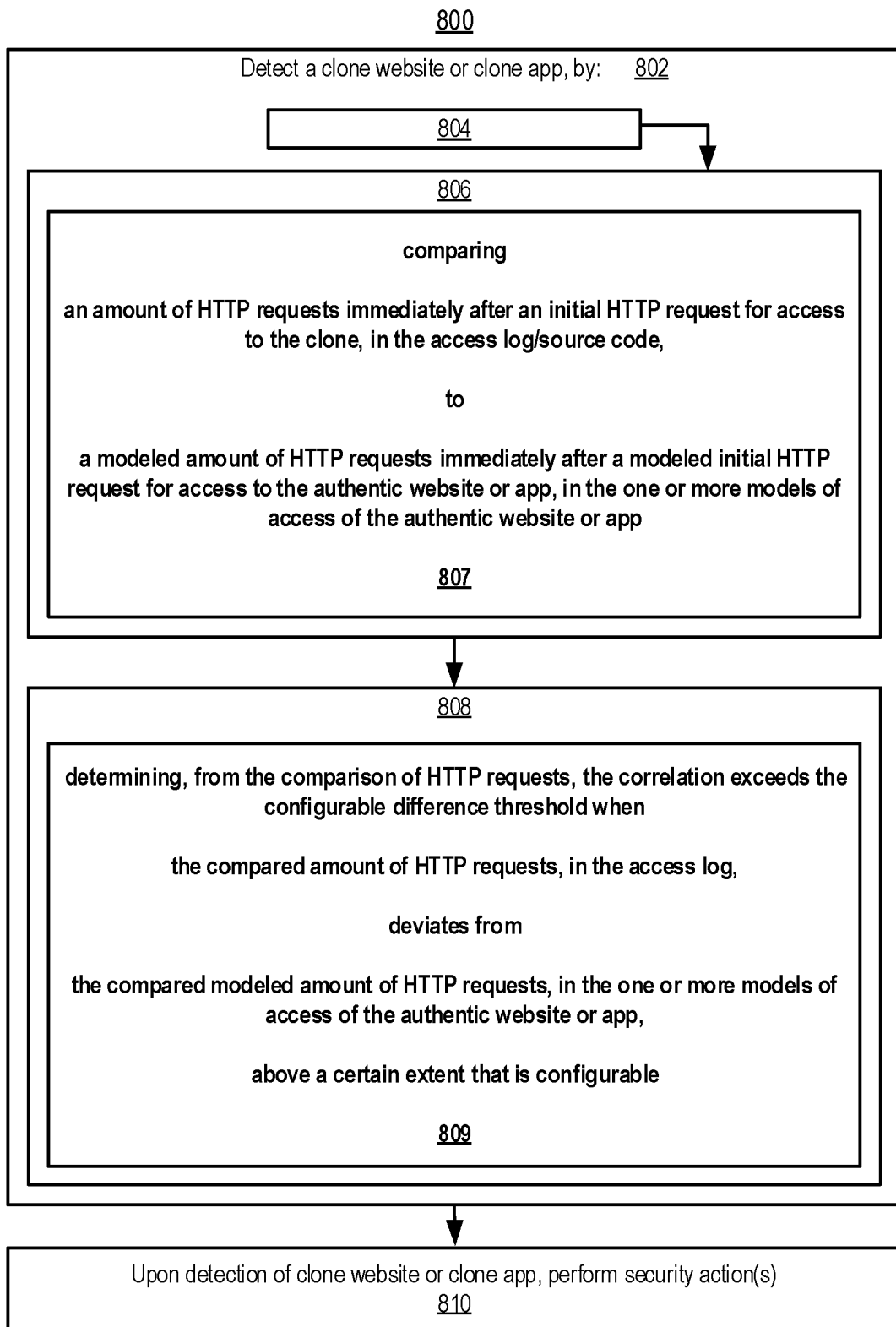
FIG. 9 shows an example embodiment of method 800 based specifically on a comparison of HTTP requests in the log against HTTP requests in the model(s), according to some embodiments.

Referring to FIGS. 8-9, at block 802, a computing device (e.g., a mobile device) detects a clone (e.g., a clone website or a clone application) cloned from an authentic electronic property (e.g., an authentic website or an authentic application) by a cloning toolkit. The detection of the clone can occur by retrieving, from an application running the clone on the device (e.g., a web browser or a system browser or a security application), one or more requests or an access log or code of the clone (e.g., one or more requests and/or an access log and/or HTML code of a clone website and/or one or more requests and/or an access log and/or source code of a clone application)—at block 804.

The detection of the clone can also occur by comparing the one or more requests or an access log or code of the clone against one or more models of access of authentic electronic properties—at block 806. In some embodiments, the detection of the clone can also occur by comparing one or more requests or an access log or code of the clone website against one or more models of website access of authentic websites. In some other embodiments, the detection of the clone can also occur by comparing an access log and/or the characteristics of one or more requests and/or source code of a clone application against one or more models of application access of authentic applications.

In some embodiments, the comparison of the access log or code can include comparing elements of the log or code associated with a login field of the authentic electronic property or a login portion of the authentic electronic property including the login field. Also, in some embodiments, the comparison of the access log or code can include comparing domain names requesting access to the authentic electronic property in the log against a list of domain names of known entities using phishing toolkits (e.g., the entities can include cloners such as cloner 160 depicted in FIG. 1).

The detection of the clone can also occur by determining, from the comparison, a correlation between the one or more requests or the access log or the code of the clone and the one or more models exceeds a difference threshold—at block 808. In some embodiments, the detection of the clone can also occur by determining, from the comparison, a correlation between the one or more requests or the access log or the code of the clone and the one or more models exceeds a difference threshold. In some other embodiments, the detection of the clone can also occur by determining, from the comparison, a correlation between the access log and/or the characteristics of one or more requests and/or the source code of the clone application and the one or more models exceeds a difference threshold.

At block 810, upon detection of the clone (such as upon detection of the clone website or clone application), at least the computing device performs one or more security actions. Actions can be taken, such as alerting a security administrator, directing serving different content to a detected phisher, or directing denying some content to a detected phisher, directing injecting some "tracking content" into the content served, or recording the IP of the fetcher.

For example, at block 812, upon detection of the clone (such as a clone website or the clone application), the computing device can alert a user of the computing device or an administrator of one or more servers serving the authentic electronic property (such as an administrator of one or more servers distributing an authentic website or an administrator of one or more servers distributing an authentic application). Also, for example, upon detection of the clone, the computing device can record one or more IP addresses (or other identifiers) of one or more computing devices serving the clone—at block 814. In such cases, the alerting can include providing an audio and/or visual indicator of the clone and the recorded one or more IP addresses of the one or more computing devices serving the clone—at block 816. Further, upon detection of the clone, the computing device can block access to the clone—at block 818. For example, upon detection of the clone, the computing device can block access to the clone by the computing device. Also, for example, upon detection of the clone, the computing device can direct blocking, by the one or more computing devices serving corresponding authentic electronic property, access to the property by the one or more computing devices serving the clone.

In some embodiments, one or more models of website access of authentic websites can include one or more models of website access of the authentic website of concern, specifically. In such examples, as shown in FIG. 9, the detecting of clone can further include comparing a number of HTTP requests immediately after an initial HTTP request for access to the clone website, in the one or more requests or the access log or the code of the clone, to a modeled number of HTTP requests immediately after a modeled initial HTTP request for access to the authentic website, in the one or more models of website access of the authentic website—at block 807. Also, as shown in FIG. 9, the detecting of clone can further include determining, from the comparison, the correlation exceeds the difference threshold when the compared number of HTTP requests, in the one or more requests or the access log or the code of the clone, deviates from the compared modeled number of HTTP requests, in the one or more models of website access of the authentic website, above a certain extent—at block 809. This comparing and determining could also be done from more generic models than the models relevant to the specific authentic website.

In some other embodiments, one or more models of access of clone applications can include one or more models of access of clone applications cloned from the authentic application of concern, specifically. In such examples, as shown in FIG. 7, the detecting of clone can further include comparing a number of HTTP requests immediately after an initial HTTP request for access to the clone application, in the access log and/or the characteristics of the one or more requests and/or the source code, to a modeled number of HTTP requests immediately after a modeled initial HTTP request for access to the authentic application, in the one or more models of access of the authentic application—at block 607. Also, as shown in FIG. 7, the detecting of clone can further include determining, from the comparison, the correlation exceeds the difference threshold when the compared number of HTTP requests, in the access log and/or the characteristics of one or more requests and/or the source code, deviates from the compared modeled number of HTTP requests, in the one or more models of access of the authentic application, above a certain extent—at block 609. This comparing and determining could also be done from more generic models than the models relevant to the specific authentic application.

In some embodiments, for responding to the detection of clones, whether the detection uses a model of access for clone properties or a model of access for authentic properties, upon detection of cloning, the computing device can direct altering, by the one or more computing devices serving the clone website or clone application, at least one part of the authentic website or the authentic application so that when the authentic property is cloned into a clone property by a phishing toolkit the clone property includes an audio and/or a visual indicator that it is a cloned version of the authentic property. The altering of the at least one part can include altering the at least one part according to one or more elements in the log that match one or more elements in the one or more models. The audio and/or visual indicator can include a voice output, a text output, audio alarm sound, a visual alarm graphic, a watermark, an animation, a popup window, a distortion of content in the clone website, or any combination thereof.

Also, upon detection of cloning, the computing device can direct altering, by the one or more computing devices serving the clone property, the at least one part of the authentic property so that when the authentic property is cloned into a clone property by a phishing toolkit, the clone property no longer includes fields for inputting sensitive information. Alternatively, upon detection of cloning of the authentic website, the altering can include altering information sent by the authentic website so that when the authentic website is cloned into a clone website by a cloning toolkit the clone website no longer sends fields for inputting sensitive information.

In some embodiments, upon detection that content of an authentic website provided to a request in association with a potential cloner, the computing device can alter the content provided to that requester. In some embodiments, the altered content is only embedded in the content provided to requests associated with potential cloners. The altered content can include visual content displayed to a user, or content not visible to a user but identifiable by a computer.

Also, upon detection of cloning of the authentic property, the computing device can direct altering, by the one or more computing devices serving the authentic property, information sent by the authentic website or the at least one part of the authentic property so that when the authentic property is cloned into a clone property by a phishing toolkit, the clone property sends or has a tracking mechanism that tracks operations of the one or more computing devices serving the clone property, covertly.

Figure 10:
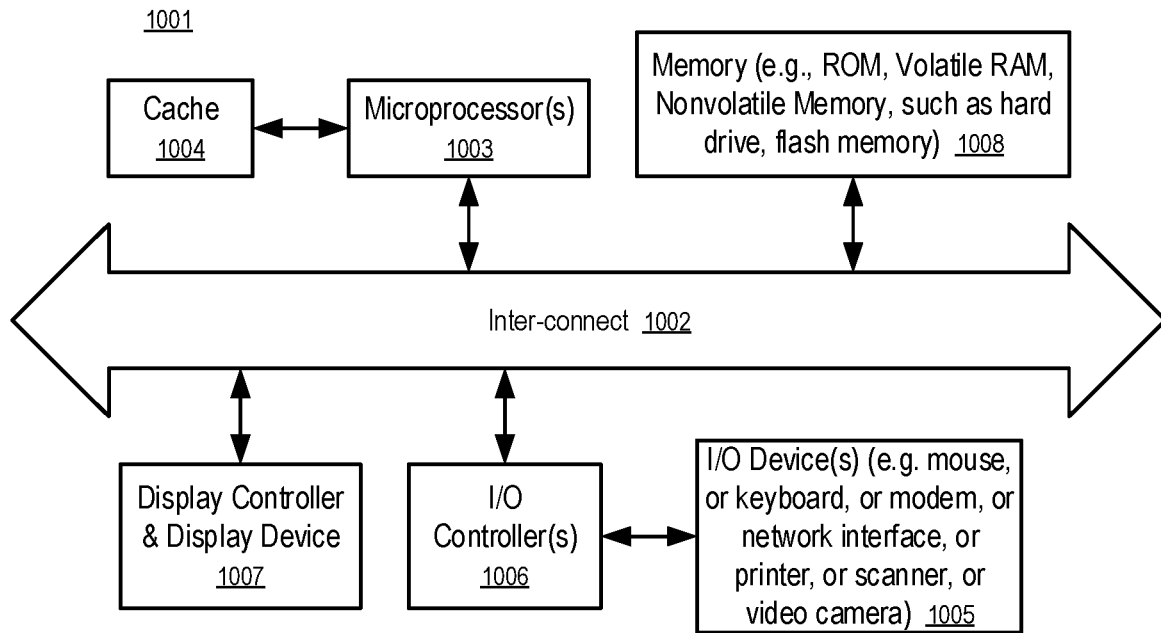
FIG. 10 shows a block diagram of a computing device, according to some embodiments.

FIG. 10 shows a block diagram of a computing device 1001, according to some embodiments. While FIG. 10 illustrates various components, it is not intended to represent any particular architecture or manner of interconnecting the components. Other systems that have fewer or more components can also be used. In an embodiment, any one of the servers of FIG. 1 can each reside on separate computing systems, or one or more can run on the same computing device, such as computing device 1001, in various combinations.

In FIG. 10, computing device 1001 includes an inter-connect 1002 (e.g., bus and system core logic), which interconnects microprocessor(s) 1003 and memory 1008. The microprocessor(s) 1003 are coupled to cache memory 1004.

The inter-connect 1002 interconnects the microprocessor(s) 1003 and the memory 1008 together and also interconnects them to a display controller and display device 1007 and to peripheral devices such as input/output (I/O) devices 1005 through input/output controller(s) 1006. Typical I/O devices include mice, keyboards, modems, network interfaces, printers, scanners, video cameras and other devices which are well known in the art.

The inter-connect 1002 can include one or more buses connected to one another through various bridges, controllers and/or adapters. In some embodiments, the I/O controller(s) 1006 include a USB (Universal Serial Bus) adapter for controlling USB peripherals, and/or an IEEE-1394 bus adapter for controlling IEEE-1394 peripherals.

The memory 1008 can include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory can also be random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In some embodiments, a computing device as illustrated in FIG. 10 is used to implement the servers illustrated in FIG. 1 and/or other servers described herein.

In another embodiment, a computing device as illustrated in FIG. 10 is used to implement a user terminal or a mobile device such as anyone of the end user devices described herein. A user terminal can be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device such as the computing device 1001.

Embodiments of the disclosure can be implemented via the microprocessor(s) 1003 and/or the memory 1008. For example, the functionalities described can be partially implemented via hardware logic in the microprocessor(s) 1003 and partially using the instructions stored in the memory 1008. Some embodiments are implemented using the microprocessor(s) 1003 without additional instructions stored in the memory 1008. Some embodiments are implemented using the instructions stored in the memory 1008 for execution by one or more general purpose microprocessor(s) 1003. Thus, the disclosure is not limited to a specific configuration of hardware and/or software.

Figure 11:
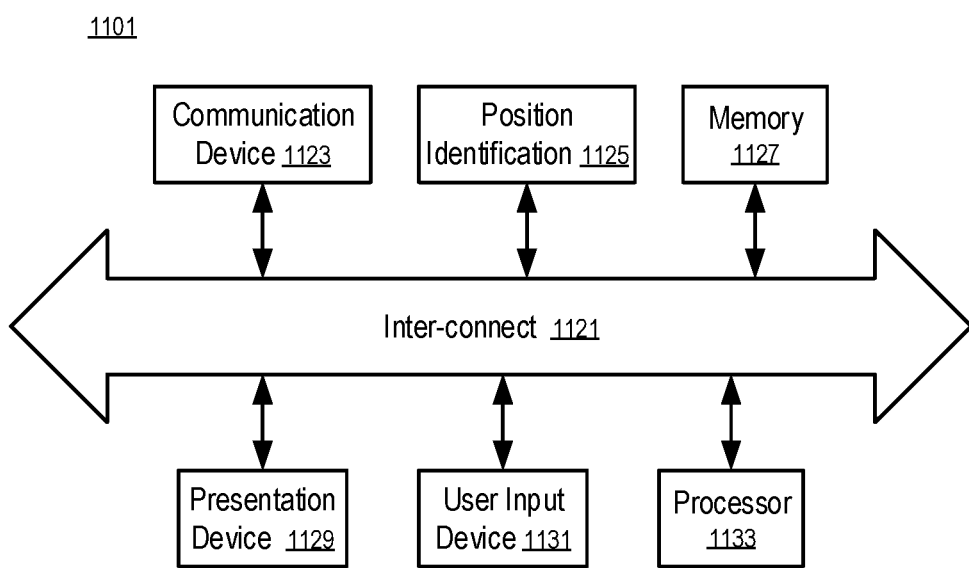
FIG. 11 shows a block diagram of a computing device (e.g., a mobile device of a user or a user terminal), according to some embodiments.

FIG. 11 shows a block diagram of a computing device (e.g., a mobile device of a user or a user terminal—such as the user terminals and mobile devices depicted in FIG. 1), according to some embodiments. In FIG. 11, the computing device 1101 includes an inter-connect 1121 connecting the presentation device 1129 (such as a display screen), user input device 1131, a processor 1133, a memory 1127, a position identification unit 1125 and a communication device 1123.

In FIG. 11, the position identification unit 1125 is used to identify a geographic location. The position identification unit 1125 can include a satellite positioning system receiver, such as a Global Positioning System (GPS) receiver, to automatically identify the current position of the computing device.

In FIG. 11, the communication device 1123 is configured to communicate with a server to provide data, including application data (e.g., an application identifier and a source identifier for a newly-sourced application). In some embodiments, the user input device 1131 is configured to receive or generate user data or content. The user input device 1131 can include a text input device, a still image camera, a video camera, and/or a sound recorder, etc.

In this description, various functions and operations can be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computing device or other system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   detecting, by a computing device, cloning of an authentic website into a clone website by a cloning toolkit, by:
      comparing characteristics of requests of the authentic web site against one or more models of website access by cloning toolkits; and
      determining, from the comparison, a correlation between the characteristics of requests and the one or more models exceeds a similarity threshold;
   upon detection of the cloning of the authentic website, altering, by the computing device, at least one part of the authentic website to comprise an indicator that it is a cloned version of the authentic website when the authentic website is cloned into the clone website by the cloning toolkit; and
   upon detection of the cloning of the authentic website, altering the authentic website to prevent sending of fields for inputting sensitive information when the authentic website is cloned into the clone website by the cloning toolkit.

2. The method of claim 1, wherein the comparison of the characteristics of requests comprises comparing elements of the characteristics of requests associated with a login field of the authentic website or a login portion of the authentic website comprising the login field.

3. The method of claim 1, wherein the comparison of the characteristics of requests comprises comparing domain names requesting access to the authentic website in the characteristics of requests against domain names in the one or more models listed as domain names of known entities using cloning toolkits.

4. The method of claim 1, further comprising upon detection of the cloning of the authentic website, recording, by the computing device, one or more Internet Protocol (IP) addresses of one or more computing devices associated with the cloning.

5. The method of claim 4, further comprising upon detection of the cloning of the authentic website, alerting a user of the computing device or an administrator of one or more servers serving the authentic website,
wherein the alerting comprises providing an audio and/or visual indicator of the cloning and the recorded one or more IP addresses of the one or more computing devices associated with the cloning.

6. The method of claim 4, further comprising upon detection of the cloning of the authentic website, altering information sent by the authentic website or the at least one part of the authentic website to comprise a tracking mechanism that tracks operations of one or more computing devices serving the clone website when the authentic website is cloned into the clone website by the cloning toolkit.

7. The method of claim 4, further comprising upon detection of the cloning of the authentic website, blocking access to the authentic website by the one or more computing devices associated with the cloning.

8. The method of claim 1, wherein the one or more models of website access by cloning toolkits comprises one or more models of website access of the authentic website specifically, and wherein the detecting of cloning further comprises:
comparing a number of HTTP requests from a requester immediately after an initial HTTP request for access to the authentic website from the requester, in the characteristics of requests, to a modeled number of HTTP requests from a modeled phisher immediately after a modeled initial HTTP request for access to the authentic website from the modeled phisher, in the one or more models of website access of the authentic website; and
determining, from the comparison of HTTP requests, the correlation exceeds the similarity threshold when the compared number of HTTP requests, in the characteristics of requests, deviates from the compared modeled number of HTTP requests, in the one or more models of website access of the authentic website, below a certain extent.

9. A non-transitory computer-readable storage medium tangibly encoded with computer-executable instructions, that when executed by a processor associated with a computing device, performs a method, the method comprising:
detecting cloning of an authentic website into a clone website by a cloning toolkit, by:
comparing characteristics of requests of the authentic website against one or more models of website access by regular users; and
determining, from the comparison, a correlation between the characteristics of requests and the one or more models exceeds a difference threshold;
upon detection of the cloning of the authentic website, altering at least one part of the authentic website to comprise an indicator that it is a cloned version of the authentic website when the authentic website is cloned into the clone website by the cloning toolkit; and
upon detection of the cloning of the authentic website, altering the at least one part of the authentic website to no longer comprise fields for inputting sensitive information when the authentic website is cloned into the clone website by the cloning toolkit.

10. The non-transitory computer-readable storage medium of claim 9, wherein the comparison of the characteristics of requests comprises comparing elements of the characteristics of requests associated with a login field of the authentic website or a login portion of the authentic website comprising the login field, and
wherein the detection of cloning further comprises comparing domain names requesting access to the authentic website in the characteristics of requests against a list of domain names of known entities using cloning toolkits.

11. The non-transitory computer-readable storage medium of claim 9, wherein the method further comprises upon detection of the cloning of the authentic website, recording one or more Internet Protocol (IP) addresses of one or more computing devices associated with the cloning.

12. The non-transitory computer-readable storage medium of claim 11, wherein the method further comprises upon detection of the cloning of the authentic website, alerting a user of the computing device or an administrator of one or more servers serving the authentic website,
wherein the alerting comprises providing an audio and/or visual indicator of the cloning and the recorded one or more IP addresses of the one or more computing devices associated with the cloning.

13. The non-transitory computer-readable storage medium of claim 11,
wherein the method further comprises upon detection of the cloning of the authentic website, altering information sent by the authentic website or the at least one part of the authentic website to comprise a tracking mechanism that tracks operations of one or more computing devices serving the clone website when the authentic website is cloned into the clone website by the cloning toolkit.

14. The non-transitory computer-readable storage medium of claim 11, wherein the method further comprises upon detection of the cloning of the authentic website, blocking access to the authentic website by the one or more computing devices associated with the cloning.

15. The non-transitory computer-readable storage medium of claim 9, wherein the one or more models of website access by regular users comprises one or more models of website access of the authentic website specifically, and wherein the detecting of cloning further comprises:
comparing a number of HTTP requests from a requester immediately after an initial HTTP request for access to the authentic website from the requester, in the characteristics of requests, to a modeled number of HTTP requests from a modeled requester immediately after a modeled initial HTTP request for access to the authentic website from the modeled requester, in the one or more models of web site access of the authentic website; and
determining, from the comparison of HTTP requests, the correlation exceeds the difference threshold when the compared number of HTTP requests, in the characteristics of requests, deviates from the compared modeled number of HTTP requests, in the one or more models of website access of the authentic website, above a certain extent.

16. A computing system, comprising:
a processor; and
a non-transitory computer-readable storage medium for tangibly storing thereon program logic for execution by the processor, the program logic comprising:
   logic executable to detect a clone website cloned from an authentic website by a cloning toolkit, the logic executable to detect the clone website comprising:
      logic executable to retrieve, from a web browser, characteristics of requests of the clone website;
      logic executable to compare the characteristics of requests of the clone website against one or more models of website access of clone websites cloned from authentic websites by cloning toolkits; and
      logic executable to determine, from the comparison, a correlation between the characteristics of requests and the one or more models exceeds a similarity threshold;
   logic executable to, upon detection of the clone website, alert a user of the computing device or an administrator of one or more servers serving the authentic website; and
   logic executable to, upon detection of the clone website, alter at least one part of the authentic website to no longer comprise fields for inputting sensitive information when the authentic website is cloned into the clone website by the cloning toolkit.

17. The computing system of claim 16, wherein the program logic further comprises logic executable to, upon detection of the clone website, record one or more Internet Protocol (IP) addresses of one or more computing devices serving the clone website, and
   wherein the logic executable to alert the user comprises logic executable to provide an audio and/or visual indicator of the clone website and the recorded one or more IP addresses of the one or more computing devices serving the clone website.

18. The computing system of claim 16, wherein the one or more models of website access of clone web sites comprises one or more models of website access of clone websites cloned from the authentic website specifically, and wherein the logic executable to detect the clone website further comprises:
   logic executable to compare a number of HTTP requests immediately after an initial HTTP request for access to the clone website, in the characteristics of requests, to a modeled number of HTTP requests immediately after a modeled initial HTTP request for access to a clone website of the clone websites cloned from the authentic web site, in the one or more models of web site access of clone web sites cloned from the authentic website; and
   logic executable to determine, from the comparison, the correlation exceeds the similarity threshold when the compared number of HTTP requests, in the characteristics of requests, deviates from the compared modeled number of HTTP requests, in the one or more models of website access of clone websites cloned from the authentic website, below a certain extent.

* * * * *